United States Patent Office 3,350,466
Patented Oct. 31, 1967

3,350,466
EMULSION SEPARATION OF AROMATIC NITRO COMPOUNDS
William K. Menke, New Martinsville, W. Va., assignor to Mobay Chemical Company, Pittsburgh, Pa., a corporation of Delaware
No Drawing. Filed June 6, 1966, Ser. No. 555,282
5 Claims. (Cl. 260—645)

ABSTRACT OF THE DISCLOSURE

Emulsions of aromatic nitro compounds and waste acids used in the nitration of the aromatic compound are separated by mixing with the emulsion an effective amount of the aromatic nitro compound produced, the aromatic nitro compound added being substantially free of acid.

---

This invention relates to the preparation of aromatic nitro compounds and more particularly, to a method of separating aromatic nitro compounds from acid emulsions.

Aromatic nitro compounds are generally prepared by nitrating aromatic hydrocarbons such as benzene, toluene, xylene and the like, by means of mixed acids of sulphuric and nitric acids in varying proportions, allowing the resulting mixture of nitro compound and waste acid to separate into layers, separating the acid layer and washing and neutralizing the nitro compound. The acid and aromatic compounds are nitrated by emulsifying the mixture, utilizing a high speed mixing apparatus. The finer the emulsion that can be formed in the nitrators, the more thorough is the nitration with the accompanying increase in yields. This fine emulsion becomes very difficult to separate within a reasonable length of time and therefore, while the yields obtained because of the fine emulsion are high, the space-time yields are low because of the difficulty of separation. Further, difficulty in the washing steps that follow the separation step of the acid from the nitro compound are hindered by the poor separation.

Several techniques have been employed in order to rapidly cause the separation of the acid phase from the nitro compound phase. One means of mechanical separation widely known has been the use of centrifuges which rapidly bring about the separation of the phases because of the difference of specific gravity. However, these apparatus are expensive, both initially and in upkeep because of the moving parts involved.

Another method employed has been the use of settling agents of different kinds which bring about the separation of the acid and nitro compound phases. While these materials bring about a proper resolution of the problem, they are disadvantageous because they introduce a foreign material into both the acid phase, which is generally recycled to one of the nitrators, and to the product phase, which is subjected to various uses. A particular problem encountered in the use of various types of de-emulsifying agents is that they become entrained in the nitro compound. In the preparation of dinitrotoluene, for example, this is particularly disadvantageous. Dinitrotoluene is a raw material used in the preparation of polyurethane foams. When foreign substances, particularly de-emulsifying agents, are carried over into the tolylene diisocyanate, the disadvantage involved becomes extremely apparent because of the unwanted properties that result in the cellular polyurethane.

It is therefore an object of this invention to provide an improved method of separating the emulsion of nitro compound and acid obtained in the nitration of aromatic compounds. It is another object of this invention to provide an improved method of recovering nitro aromatic compounds. It is still another object of this invention to provide a method of separating aromatic nitro compounds and waste acid emulsions rapidly and effectively without introducing foreign materials. It is still a further object of this invention to provide a method of separating mixtures of aromatic nitro compounds and waste acids without the need of apparatus having moving parts. It is a further object of this invention to provide a method of separating dinitrotoluene from emulsions of dinitrotoluene and mixtures of sulphuric acid and nitric acid.

The foregoing objects and others which will become apparent from the following description are accomplished in accordance with the invention, generally speaking, by providing a method of separating aromatic nitro compound-waste acid emulsions by mixing with the emulsion an effective quantity of the aromatic nitro compound substantially free of acid, to bring about the separation of the emulsions. More particularly, the invention relates to the separation of dinitrotoluene from an emulsion containing nitric acid, sulphuric acid and dinitrotoluene by introducing dinitrotoluene that has been substantially freed of acid into the emulsion at a rate of from 0.14/1 to 7/1 parts by volume per part of emulsion. The preferred ratio is from about 0.5/1 to 2/1. It has been surprisingly found that when the nitro compound sought to be obtained, such as dinitroluene, which is substantially free of acid, is returned to the emulsion, this emulsion separates into two distinct phases simply upon slight agitation. While the invention is applicable, particularly in the preparation of dinitrotoluene, it is equally as applicable in the production of nitro aromatic compounds such as, for example, nitrobenzene, dinitrobenzene, xylene, nitroxylene, dinitroxylene, naphthylene, nitronaphthylene, dinitronaphthylene, anthracene, nitroanthracene, dinitroanthracene and the like.

The invention is further illustrated but not limited by the following examples in which parts are by weight unless otherwise specified.

EXAMPLE 1

About 100 parts per hour by volume of mononitrotoluene obtained from a prior nitration of toluene are introduced into a nitration apparatus equipped with a heat exchanger and high speed agitator together with about 110 parts per hour of a mixture of 70% by weight of sulphuric acid and 30% by weight of nitric acid. The mixture within the nitration apparatus is rapidly agitated and the reaction is exothermic. A finely dispersed emulsion is formed in the nitrator.

EXAMPLE 2

The emulsion containing dinitrotoluene prepared in accordance with Example 1 is separated into 5 portions of 100 parts by volume each. To each 100 part portion is added the following quantities of substantially acid free dinitrotoluene:

| | |
|---|---|
| 14.3 parts | 300 parts |
| 33.3 parts | 700 parts |
| 100 parts | |

In each case, the emulsion separates immediately following gentle agitation of the mixture.

EXAMPLE 3

About 100 parts per hour of benzene are introduced into a nitration apparatus equipped with a heat exchanger and a high speed agitator together with about 150 parts per hour of a mixture of 70% by weight of sulphuric acid and about 30% by weight of nitric acid. The mixture within the nitration apparatus is rapidly agitated and the reaction is exothermic. A finely dispersed emulsion is formed in the nitrator. Upon removal from the nitrator, about 100 parts by volume of the emulsion is gently agitated with about 100 parts by volume of substantially acid free nitrobenzene. The emulsion separates very shortly after the agitation is ceased.

It is of course to be understood that any nitro aromatic compound may be separated from the spent acid emulsion used in the nitration thereof and that any of the nitro compounds set forth above may be used in place of those of the examples.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A method of separating an emulsion of an aromatic nitro compound and the acid used in the preparation of said nitro compound which comprises mixing with said emulsion an effective amount of the nitro compound present therein, said compound being substantially free of acid to thereby bring about separation of the emulsion.

2. The process of claim 1 wherein the aromatic nitro compound is dinitrotoluene.

3. The process of claim 1 wherein the acid is a mixture of nitric and sulphuric acids.

4. The process of claim 1 wherein the quantity of nitro compound added to bring about a separation of the emulsion is in an amount of from about 0.14/1 to about 7/1 based on the volume of the emulsion present.

5. The process of claim 1 wherein the quantity of nitro compound added to bring about a separation of the emulsion is in an amount of from about 0.5/1 to 2/1.

References Cited

UNITED STATES PATENTS

| | | | |
|---|---|---|---|
| 2,400,904 | 5/1946 | Batchelder | 260—645 |
| 2,499,927 | 3/1950 | Martin | 260—645 |

BENJAMIN R. PADGETT, *Primary Examiner.*

CARL D. QUARFORTH, *Examiner.*

L. A. SEBASTIAN, *Assistant Examiner.*